Figure 5:
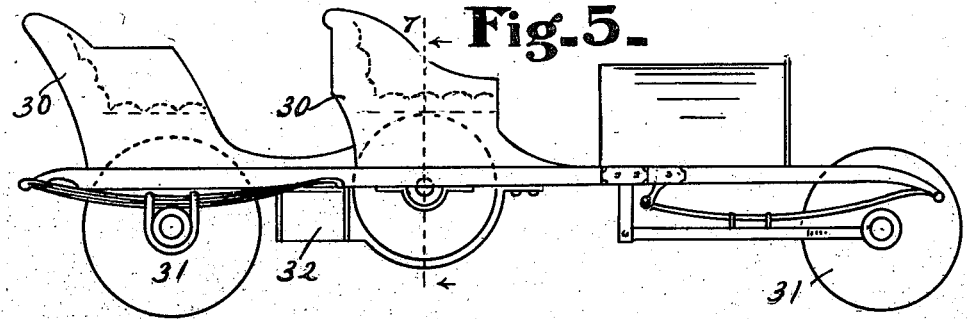

C. L. DAUGHERTY.
BALANCING VEHICLE.
APPLICATION FILED SEPT. 5, 1907.
960,838.
Patented June 7, 1910.
4 SHEETS—SHEET 1.
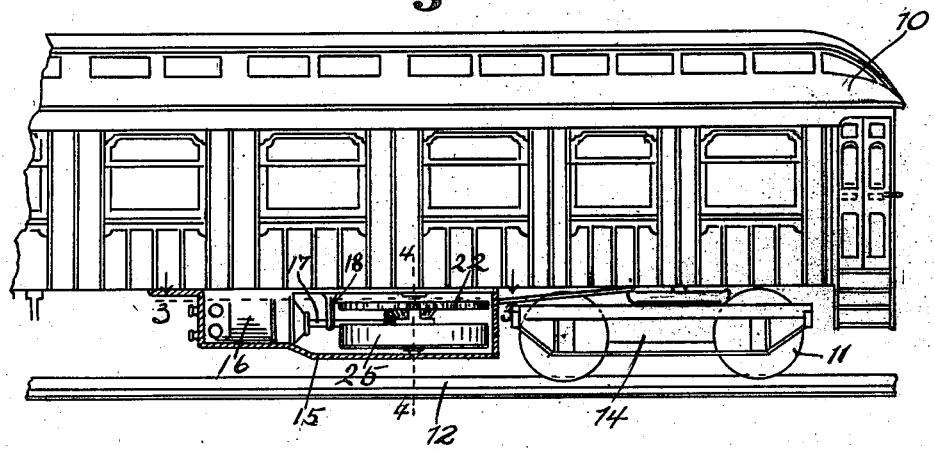
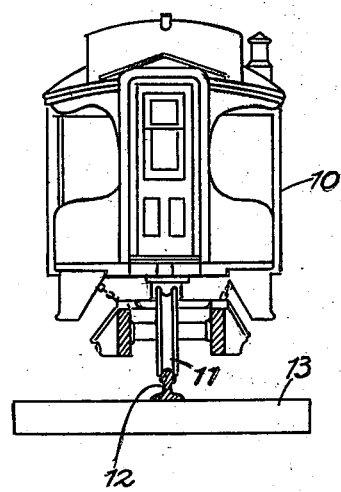
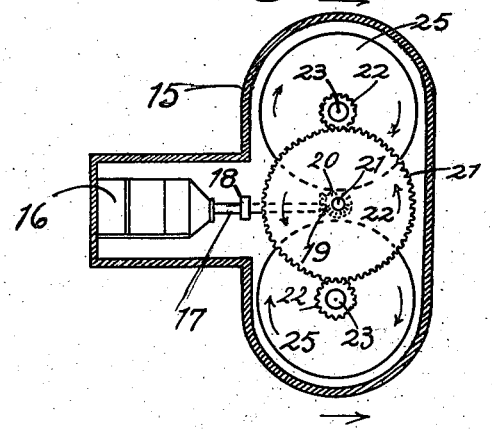
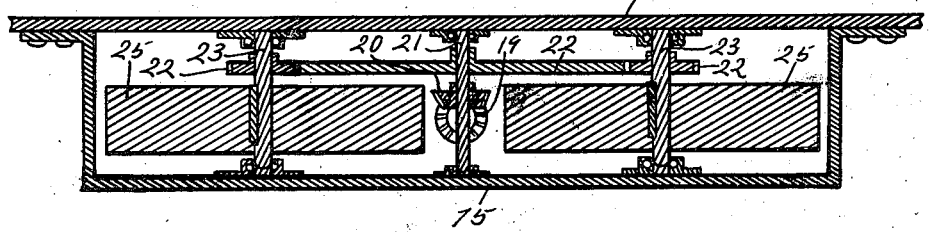
WITNESSES:
W. M. Gentle
Olive Breeden
INVENTOR.
Clifton L Daugherty.
BY
ATTORNEY.

C. L. DAUGHERTY.
BALANCING VEHICLE.
APPLICATION FILED SEPT. 5, 1907.

960,838.

Patented June 7, 1910.
4 SHEETS—SHEET 2.

WITNESSES:
Olive Breeden
W. M. Gentto

INVENTOR.
Clifton L. Daugherty
BY
V. H. Lockwood.
ATTORNEY.

C. L. DAUGHERTY.
BALANCING VEHICLE.
APPLICATION FILED SEPT. 5, 1907.

960,838.

Patented June 7, 1910.
4 SHEETS—SHEET 3.

WITNESSES:
Olive Breeden
W. M. Gentle

INVENTOR.
Clifton L. Daugherty.
BY
ATTORNEY.

C. L. DAUGHERTY.
BALANCING VEHICLE.
APPLICATION FILED SEPT. 5, 1907.

960,838.

Patented June 7, 1910.
4 SHEETS—SHEET 4.

WITNESSES:
Olive Breeden.
W. M. Gentle.

INVENTOR.
Clifton L. Daugherty.
BY
ATTORNEY.

UNITED STATES PATENT OFFICE.

CLIFTON L. DAUGHERTY, OF INDIANAPOLIS, INDIANA.

BALANCING VEHICLE.

960,838.  Specification of Letters Patent.  Patented June 7, 1910.

Application filed September 5, 1907. Serial No. 391,508.

*To all whom it may concern:*

Be it known that I, CLIFTON L. DAUGHERTY, of Indianapolis, county of Marion, and State of Indiana, have invented a certain new and useful Balancing Vehicle; and I do hereby declare that the following is a full, clear, and exact description thereof, reference being had to the accompanying drawings, in which like numerals refer to like parts.

The object of this invention is to construct a vehicle so that it can run on only one series of wheels arranged tandem. Thus a railway car, street car or other car that is run upon a railway could travel upon one rail only and two rails would not be needed. The wheels would be arranged one behind the other in a single row or line centrally beneath the car. The invention is not limited to any particular kind of vehicle as it may be used for any vehicle, including locomotives, railway cars, street cars, interurban cars, automobiles and the like. The arrangement is substantially the same for automobiles and other ordinary road vehicles as for railway cars and the like. This object is accomplished by providing a vehicle with means for automatically balancing and maintaining the equilibrium of the vehicle on one tandem series of wheels centrally located beneath it, whether the vehicle be moving, turning a curve or standing still. Whether the vehicle be moving at a certain speed or moving at all is immaterial to the operation and success of the balancing mechanism, as said mechanism balances the vehicle as long as the balancing mechanism is driven and it can be driven while the vehicle is standing still.

The chief feature of the invention consists in providing in connection with the vehicle one or more sets of two fly-wheels each revolving in opposite directions at a high rate of speed. It is well known that a fly-wheel or other wheel when driven at high centrifugal speed will tend to maintain the position of the parts on which it is mounted *in statu quo.* Thus a spinning top will maintain its vertical position when revolving at a high speed. It is not material whether the balancing wheels be arranged to operate vertically or horizontally. The casing in which said wheels are mounted and driven at a high speed can be maintained automatically in any desired position, that is, vertically or horizontally or at an inclination. When this principle is applied to the balancing of vehicles supported on wheels arranged tandem, only two things are necessary, namely, that the balance wheels are sufficiently heavy relative to the weight of the vehicle and secondly, that they be driven at a sufficiently high rate of speed.

In connection with the foregoing, another feature of my invention consists in providing means for bracing the vehicle and holding it upright in case of accident or stoppage of the operation of the automatic balancing mechanism. On each side of the vehicle vertically movable braces or supports are mounted, as here shown, in air cylinders and are actuated by compressed air so that all of the braces on the vehicle may be controlled by a single means and at a single point and such compressed air will not only force the braces down into the bracing position but will move them up to their inoperative position and in either position the braces will be locked in place, and air controlled means are provided for releasing the lock. Furthermore, means are provided for showing whether the braces are in their locked position, either when elevated or when lowered.

The general nature of this invention will be understood from the accompanying drawings and the following description and claims.

Figure 6:
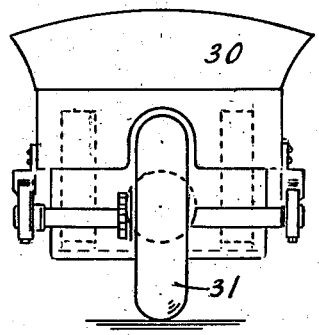
Figure 7:
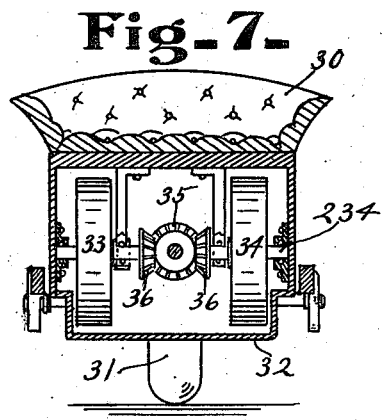
Figure 8:
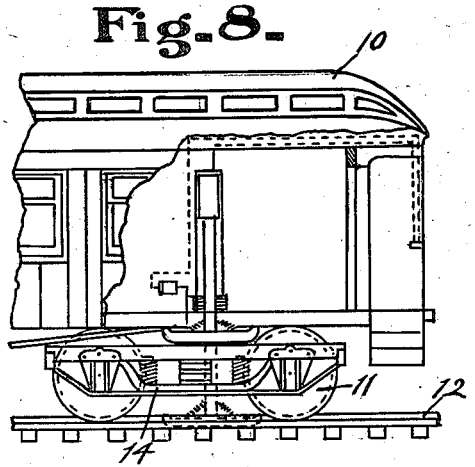
Figure 9:
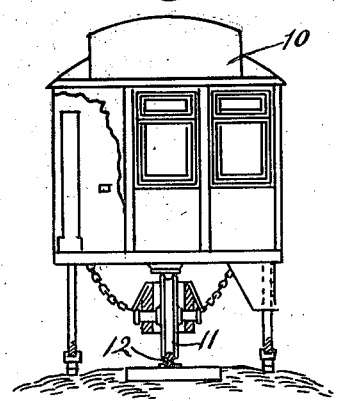
Figure 10:
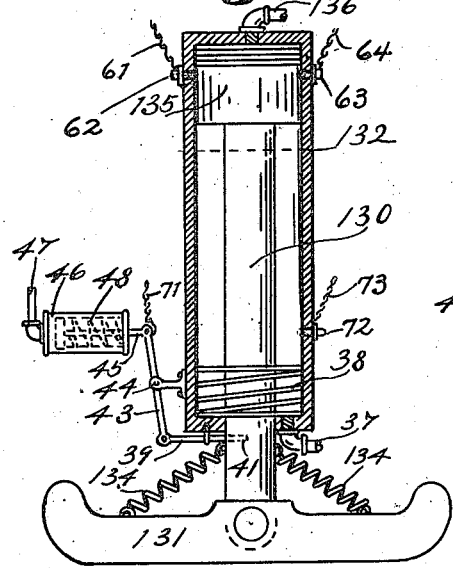
Figure 11:
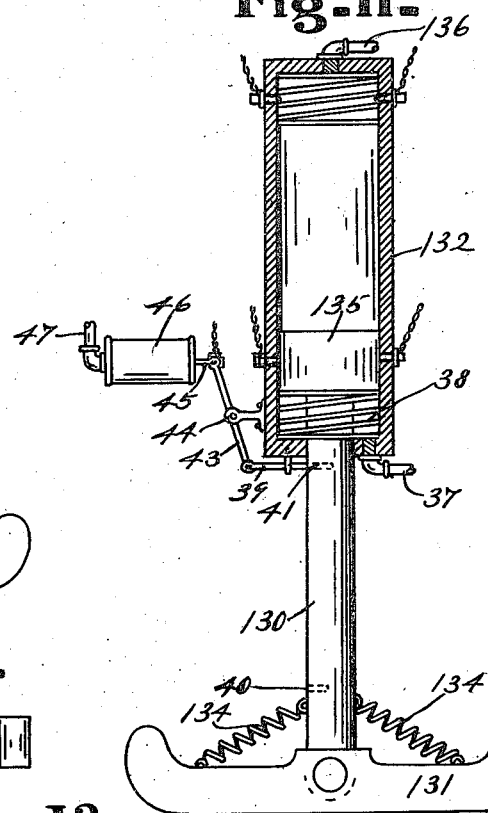
Figure 14:
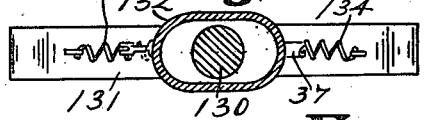
Figure 13:
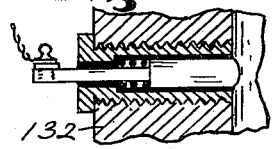
Figure 12:
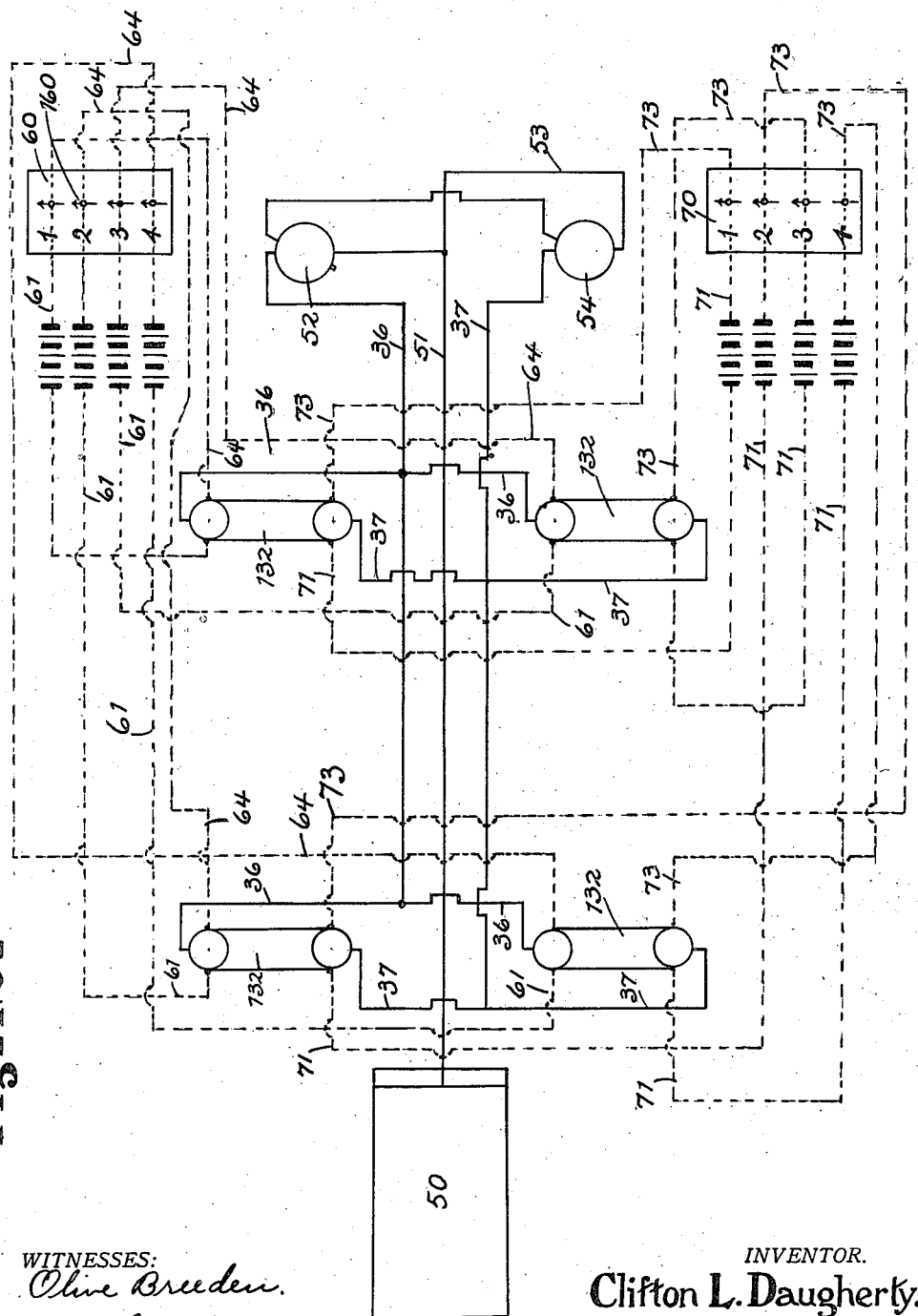

In the drawings Figure 1 is a side elevation of one-half of a railway car equipped with my invention, the balancing mechanism being in vertical section. Fig. 2 is an end elevation of the car on a track. Fig. 3 is a horizontal section on the line 3—3 of Fig. 1. Fig. 4 is a vertical transverse section on the line 4—4 of Fig. 1. Fig. 5 is a side elevation of an automobile equipped with my invention. Fig. 6 is an end elevation thereof. Fig. 7 is a vertical transverse section on the line 7—7 of Fig. 5, showing a modified form of the balancing mechanism as compared to that shown in the first four figures. Fig. 8 is a side elevation of one-half of a car with the side of the car partly broken away to show a brace in place, the brace being shown in its elevated position by full lines and in its lowered position by dotted lines. Fig. 9 is an end elevation of the car with one side thereof partly broken away and showing the braces in their downmost and bracing position. Fig. 10 is a central vertical section through the bracing mechanism on an enlarged scale, showing the brace up. Fig. 11 is the same showing the braces down. Fig. 12 is a diagrammatic view of the piping and wiring system in the car for controlling the operation of the braces. Fig. 13 is a section through a contact point and adjacent parts. Fig. 14 is a horizontal section through a cylinder and brace looking downward upon the shoe and omitting other parts.

Referring now to the details of the drawings, the railway car 10 is not guided by a double series of wheels as usual but the wheels 11 are arranged one behind the other tandem so as to ride upon only one rail 12. 13 represents the cross-ties. This rail should have a well rounded head and the wheels 11 should be well flanged on both sides with the tread portion semicircular in cross-section to fit upon the curved head of the rail. The wheels are mounted centrally beneath the car on the trucks 14, which are made of ordinary form and mounted in connection with the car in the ordinary way. Of course, the number of wheels mounted tandem under the vehicle can be modified to suit the vehicle.

In connection with the body of the car and preferably under the same I secure a casing 15 in which a motor 16 is mounted that is driven by electricity from any source of supply carried by the vehicle or conveyed thereto through a trolley mechanism, if desired. The motor 16 has a shaft 17 mounted in the bearing 18 and carrying on its end the bevel gear 19 that meshes with the bevel gear 20 on the vertical shaft 21 that is mounted in the bearings on the bottom of the casing 15 and the bottom of the car 10. The vertical shaft 20 carries a gear 21 that meshes with pinions 22 on the vertical shaft 23 that are likewise mounted in bearings on the bottom of the casing and car. The shaft 23 carries a heavy fly-wheel or balancing wheel 25 arranged horizontally. The gearing, as shown in Fig. 3, is such as to greatly multiply the speed of the fly-wheel 25 as compared with the motor shaft 17 or any intermediate part. As high speed has much to do with the efficiency of the device, the bearings for the shafts are preferably as free from friction as possible, the lower bearings 26 furnishing the concave bearing surface for the rounded lower ends of the shafts and the upper bearings 27 being preferably ball bearings.

Figs. 5, 6 and 7 show a modified form of the balancing mechanism and also the application of the invention to automobiles. The bottom of the automobile 30 is carried upon a pair of wheels 31 arranged tandem and may be otherwise mounted in the usual way. Beneath the car there is a casing 32 carrying an electric motor like that shown in Fig. 3 and the fly-wheels 33 and 34 are vertically disposed on horizontal shafts 234 that are driven by intermediate gears 35 and 36. There is one balancing wheel preferably on each side of the automobile body and since the same are arranged vertically a recess is provided in the lower part of the automobile body to receive the upper portions of the balancing wheels and permit them to operate. The tendency of the fly-wheels when revolved at a high speed will be to maintain upright the entire car as long as the balancing mechanism is kept in operation. Therefore, the balancing mechanism should be operable independent of the traveling mechanism so that the balancing mechanism can continue to operate while the car is standing still in order to maintain its balance.

I provide a bracing mechanism for supporting the vehicle or car when the balancing mechanism is not in operation, as in case of accident or the stoppage thereof for any other reason. This mechanism appears more fully in Figs. 9 to 12. In each side of the car near each end a bracing mechanism is mounted, so that in a car there would be four of them, all alike. The brace 130 is a heavy bar pivotally mounted in the middle of a shoe 131 at the lowest end, the upper end of the brace projecting into and operating vertically in a cylinder 132 that is built within the car. The brace extends through the floor of the car. Springs 134 connect the ends of the shoe with the opposite sides of the brace so as to hold the shoe horizontally and permit it to conform to irregularities in the surface of the ground. The upper end of the brace is enlarged at 135 so as to form practically a piston. Air is introduced through the pipe 136 in the upper end of the cylinder for forcing the braces downward and air is introduced through the pipe 37 at the lower end of the cylinder for raising the braces. In the lower end of the cylinder there is a coiled spring 38 to check the downward thrust of the brace. When in its uppermost position the brace is locked by the spring-actuated plug 39 which is secured at the bottom of the cylinder and projects into the recess 40 near the lower end of the brace. The same plug locks the brace in its downward position by entering the recess or hole 41 near the upper end of the brace. The locking plug 39 is withdrawn by the lever 43 that is fulcrumed at 44 to the side of the cylinder and is actuated by the piston rod 45 in the auxiliary cylinder 46 to which the compressed air is admitted through the pipe 47. Spring 44 in cylinder 46 actuates the plug 39.

The car is provided with a compressed air tank 50 from which a pipe 51 conveys the air to a controller 52, used for lowering the braces, and through a branch pipe 53 to a controller 54, used for elevating the braces.

These controllers 52 and 54 are, in the case of street cars, located in the motorman's compartment, and in other vehicles so located as to be convenient to operate. The controllers are substantially the same in character and construction as those employed in air brake systems on cars. From both controllers a pipe 47 leads to the auxiliary pistons 46. From the controller 52 the pipe 36 leads to the upper ends of the cylinders 132 and from the controller 54 the pipes 37 lead to the lower ends of the cylinders. The pipes 47 should lead from the controllers at points in advance of the pipes 36 and 37 so that in operating the controllers the compressed air will first disengage the plugs 39 from the braces and thereafter, by further operation of the controller, will elevate or lower the brace. Pipes 36, 37 and 47 run to all the brace mechanisms on the car so that they are all simultaneously operated in the same way.

In order that the motorman or vehicle driver may know that all the braces are locked in their elevated or lowered positions, an electrical indicating mechanism is provided, as shown in Fig. 12. Thus the indicator 60 has indicating hands 160 for each brace mechanism on the car and from each indicating hand a wire 61 leads to the contact 62 in the upper part of a cylinder 132. A contact 63 in the cylinder oppositely located is connected with the indicating finger by a return wire 64. The two contacts 62 and 63 project through the wall of the cylinder far enough to be engaged by the head 135 of the brace and thereby the circuit is closed when the brace is up. A similar circuit runs to all the other brace mechanisms. Likewise, an indicator 70 is provided to show when the braces are locked down. A wire 71 runs therefrom to the upper end of the lever 43 that is connected with the plug 39 and that with the braces 130. From the contact plug 72 a wire 73 leads back to the indicator so as to complete the circuit when the brace is down as then the head 135 is in contact with the plug 72. The wiring for all the other braces from this indicator 70 is the same as that just described.

What I claim as my invention and desire to secure by Letters Patent is:

1. The combination with a vehicle, a series of transporting wheels arranged tandem centrally under said vehicle, means for automatically balancing the vehicle, braces adapted to hold the vehicle upright when the balancing mechanism is not in operation, said braces being mounted in the car so as to be vertically reciprocable, a shoe on the lower end of each brace pivotally mounted between its ends, and yielding means for normally holding the shoe in horizontal position.

2. The combination with a vehicle, a series of transporting wheels arranged tandem centrally under said vehicle, means for automatically balancing the vehicle, braces adapted to hold the vehicle upright when the balancing mechanism is not in operation, said braces being mounted in the car so as to be vertically reciprocable, a shoe on the lower end of each brace pivotally mounted between its ends, and a spring on each side of the brace extending from the brace to the shoe for holding it horizontally.

3. The combination with a vehicle, a series of transporting wheels arranged tandem centrally under said vehicle, means for automatically balancing the vehicle, braces vertically reciprocable in the vehicle for holding the same when the balancing mechanism is not in operation, and means for holding said braces in their elevated and lowered positions.

4. The combination with a vehicle, a series of transporting wheels arranged tandem centrally under said vehicle, means for automatically balancing the vehicle, braces vertically reciprocable in the vehicle for holding the same when the balancing mechanism is not in operation, vertically disposed cylinders in the vehicle in which said braces are reciprocably mounted, and pneumatic means for elevating and lowering said braces.

5. The combination with a vehicle, a series of transporting wheels arranged tandem centrally under said vehicle, means for automatically balancing the vehicle, braces vertically reciprocable in the vehicle for holding the same when the balancing mechanism is not in operation, vertically disposed cylinders in the vehicle in which said braces are reciprocably mounted, pneumatic means for elevating and lowering said braces, spring actuated means for locking the braces in their elevated and lowered positions, and pneumatic means for releasing said locking means.

6. The combination with a vehicle, a series of transporting wheels arranged tandem centrally under said vehicle, means for automatically balancing the vehicle, braces vertically reciprocable in the vehicle for holding the same when the balancing mechanism is not in operation, means for locking said braces in their elevated and lowered positions, and means for indicating whether each of said braces is locked in its upper or lower position.

7. The combination with a vehicle, a series of transporting wheels arranged tandem centrally under said vehicle, means for automatically balancing the vehicle, braces vertically reciprocable in the vehicle for holding the same when the balancing mechanism is not in operation, vertically disposed cylinders in the vehicle in which said braces are reciprocably mounted, pneumatic means for elevating and lowering said braces, means for locking the braces in their elevated and lowered positions, indicators for indicating whether or not each brace is locked in its elevated or lowered position, contact points between the cylinders and braces, and electrical conductors running from said contact points to said indicators.

In witness whereof, I have hereunto affixed my signature in the presence of the witnesses herein named.

CLIFTON L. DAUGHERTY.

Witnesses:
V. H. LOCKWOOD,
OLIVE BREEDEN.